US007024059B2

(12) United States Patent
Kurchuk

(10) Patent No.: US 7,024,059 B2
(45) Date of Patent: Apr. 4, 2006

(54) OPTOELECTRONIC RECEIVER AND METHOD OF SIGNAL ADJUSTMENT

(75) Inventor: Boris A. Kurchuk, Bridgewater, NJ (US)

(73) Assignee: TriQuint Technology Holding Co., Hillsboro, OR (US)

( * ) Notice: Subject to any disclaimer, the term of this patent is extended or adjusted under 35 U.S.C. 154(b) by 767 days.

(21) Appl. No.: 09/771,279

(22) Filed: Jan. 26, 2001

(65) Prior Publication Data

US 2002/0101641 A1 Aug. 1, 2002

(51) Int. Cl.
*G02B 6/00* (2006.01)
*H04B 10/08* (2006.01)

(52) U.S. Cl. ........................... 385/12; 385/14; 385/88; 385/92; 398/25; 398/27; 398/33; 398/37; 398/140; 398/160

(58) Field of Classification Search ................. 385/12, 385/14, 88, 89, 92.94; 250/227.11; 398/25, 398/27, 33, 37, 140, 160
See application file for complete search history.

(56) References Cited

U.S. PATENT DOCUMENTS 5,408,863 A * 4/1995 Sawyers et al. ........... 73/35.05
5,493,390 A * 2/1996 Varasi et al. .................. 356/32
5,953,690 A 9/1999 Lemon et al. .............. 702/191
6,016,374 A 1/2000 Adams et al. ................ 385/24
6,098,022 A * 8/2000 Sonnichsen et al. .......... 702/35
6,333,941 B1 * 12/2001 Hung .......................... 372/20
2002/0101641 A1 * 8/2002 Kurchuk ..................... 359/189
2004/0119981 A1 * 6/2004 May ........................... 356/480

FOREIGN PATENT DOCUMENTS

EP 001227607 A2 * 7/2002 .................. 385/12

OTHER PUBLICATIONS

Miller, Stewart E. and Ivan P. Kaminow (eds.), *Optical Fiber Telecommunications II,* "Receiver Design," Kasper, Bryon L., 1988, pp. 696-699.
Alexander, Stephen B., *Optical Communication Receiver Design,* "Receiver Noise, Pulse Shaping Filers, and the Eye Diagram," 1997, pp. 233-238.

* cited by examiner

*Primary Examiner*—Brian M. Healy
(74) *Attorney, Agent, or Firm*—Lester H. Birnbaum

(57) ABSTRACT

An optoelectronic receiver having a variable transfer function to compensate for operational condition change. The receiver comprises a linear circuit having a tunable filter. A control circuit provides a signal to the tunable filter. The control circuit is connected to one or more sensors which sense one or more operational conditions. The control circuit signal is a function of the one or more sensed operational conditions. The control signal is input to the tunable filter which adjusts the linear circuit's transfer function based on the control signal. Further disclosed are an integrated circuit and optical communication system having the inventive optoelectronic receiver. A method for adjusting an optoelectronic signal in a receiver is also disclosed.

17 Claims, 12 Drawing Sheets

OPTOELECTRONIC RECEIVER AND METHOD OF SIGNAL ADJUSTMENT

FIELD OF THE INVENTION

The invention relates to optical communication systems and more particularly to optoelectronic receivers.

BACKGROUND OF THE INVENTION

Optical fiber communication systems typically carry a plurality of signals over different paths. These paths may be modified over time as the system is updated or changed. Variations in path length, fiber types and components encountered by optical signals may degrade a signal. Additional conditions and parameters such as temperature, input power and wavelength may also affect the characteristics of the signal.

To maintain quality of service in an optical fiber communication system, bit-error-rate (BER) should be minimized and signal-to-noise ratio (SNR) at the decision time of the decision circuit should be maximized. An optoelectronic receiver linear circuit comprising a photodiode, amplifier and low pass filter provide a transfer function to shape the received signal spectrum. The low pass filter optimizes the transfer function to desired characteristics, typically compensating for the band shape of the photodiode and amplifier to produce a channel shape that minimizes inter-symbol interference (ISI) and BER and maximizes SNR on the input of the decision circuit. Typically each stage of the receiver contributes to the transfer function of the overall post-detection filter. The combination of photodetector and amplifier transfer functions can be used to develop the filter transfer function.

Frequency response functions of the linear circuit components vary with different operational conditions and as a result of manufacturing variations. Operational conditions may include, for example, temperature, time, channel number in wavelength division multiplexing (WDM) systems, noise, etc. An avalanche photodiode (APD) for example, has gain and noise characteristics that generally vary depending on the bias voltage, temperature and age of the device. A typical APD transfer function changes as a function of temperature change as shown in FIG. 1. For a particular amplitude the APD frequency increases as temperature decreases. Lines 102 and 104 in FIG. 1 depict the transfer functions at a low temperature, and high temperature, respectively.

A further example of a linear circuit component whose performance varies according to operating conditions is a transimpedance amplifier (TIA) having automatic gain control (AGC). A TIA gain frequency response typically depends on the input current or supply voltage and can vary over temperature.

Manufacturing variations of components may also affect the linear circuit transfer function. For example, a TIA integrated circuit and optical subassembly (OSA) wire bond may have variations in wire bond length from one component to another and within a component, resulting in the distribution of their parasitic inductance, thereby affecting the transfer function. The effect of the wire bond length distribution on the inductance variation increases if the receiver bit-rate and linear circuit bandwidth increase.

Total noise spectra may also vary as operational conditions change. Different optical transmitters and channels in a dense wavelength division multiplexing (DWDM) system may have different noise spectra. Noise may also vary as the spontaneous emission power generated by the optical amplifier varies.

Because parameters of a transmitter, channel and linear circuit of the receiver are not stable when operational conditions are changed, the input signal and noise spectra may vary. Therefore, a low pass filter with fixed parameters, such as a fixed bandwidth, does not provide optimum channel shaping and noise filtering over the different operational conditions.

If, for example, at an operational condition the filter pass band is too wide, the additional noise power coming to a decision circuit from the optoelectronic receiver degrades SNR, BER and the receiver sensitivity. If the filter bandwidth is too narrow or if the received pulse shape does not satisfy a Nyquist criteria, ISI increases, and BER and sensitivity degrade.

FIG. 2 depicts a prior art optical receiver 200. A power supply 202 and temperature sensor 204 provide a temperature-compensated biasing voltage to photodiode 206 over a temperature range. This temperature-compensated biasing voltage is needed for an APD-type receiver only. PIN-type receivers usually do not require such biasing. A photocurrent sensor 208 may also be included to provide further adjustment to the biasing voltage, or to provide monitoring of an optical system operation. An optical input light (OIL) sensor 210 provides an electrical signal from an additional output of amplifier 212 that is proportional to the power of the photodetector input optical signal. Amplifier 212 provides a signal to low pass filter 214 which provides a filtered signal to decision circuit 216. A quasi-BER detector 218 provides a signal indicating BER of the output electrical signal from the decision circuit.

Limitations of conventional fiberoptic receivers have been addressed by utilizing a microcontroller to dynamically monitor and control parameters of an optoelectronic device and other receiver module components. During calibration procedures of the receiver, the components of the receiver module are characterized over a defined operating temperature and voltage supply range. Characteristic data and/or curves defining these operational control and monitoring functions over the range of operating conditions are stored in non-volatile memory. During operation of the receiver the module's operational parameters are controlled based on the current operating conditions.

Another approach to improve optical receiver performance includes providing a linear channel section with an active equalizer controlled by the photo current of an input network. By utilizing the inverse relationship between the impedance of the front end and the input signal current and an appropriate scaling of the current transfer gain, the equalizer frequency response is made to track changes in the front end frequency response.

Existing techniques as described above do not adequately address the transfer function variations of the linear circuit at different operational conditions. Such variations change the shape of pulses, increase ISI and decrease SNR on the input to the decision circuit. Furthermore, BER and sensitivity of the receiver may be degraded and may limit the operating conditions under which the circuit may be used. At ultra high bit-rates even a small signal distortion may induce significant degradation of system performance. Accordingly, there is a need for an optical receiver having a variable transfer function to compensate for operating conditions.

Such a system may reduce adverse effects due to manufacturing variations, and may negate the need for extensive testing and selection of receiver components which is costly and time consuming for the mass production of receivers.

Furthermore, prior art systems do not control the shape of the frequency response of the linear circuit of the receiver, and therefore, high sensitivity can not be reached at different operational conditions.

Additionally, an approach utilizing an equalizer as described above is limited to use in receivers with AGC. The equalizer, which is a high pass filter is controlled by a photocurrent only. Use of the equalizer in the linear circuit of the fiberoptic receiver typically causes a sensitivity penalty due to noise from stages following the equalizer or reduction in dynamic range due to saturation of the amplifier preceding the equalizer. Therefore, little or no sensitivity improvement is provided by such a design.

SUMMARY OF THE INVENTION

An optoelectronic receiver having a variable transfer function to compensate for operational condition changes is disclosed. The receiver comprises a linear circuit having a tunable filter. A control circuit provides a signal to the tunable filter through a second filter which provides noise filtering. The control circuit is connected to one or more sensors which sense one or more operational conditions. The control circuit signal is a function of the one or more sensed operational conditions. The filtered control signal is input to the tunable filter which adjusts the linear circuit's transfer function based on the filtered control signal.

Further disclosed are an integrated circuit and optical communication system having the inventive optoelectronic receiver. Still further disclosed is a method for adjusting an optoelectronic signal in a receiver.

DESCRIPTION OF THE DRAWINGS

The invention is best understood from the following detailed description when read with the accompanying drawings.

DETAILED DESCRIPTION OF THE INVENTION

The optoelectronic receiver of the present invention provides a signal adjusted for varying operating conditions. As used herein "conditions" includes any variable environmental characteristics such as temperature and noise, and variations in component specification and performance parameters. Advantageously, varying paths or channels within an optical fiber communication system, manufacturing variations of system components and environmental variances should not affect the sensitivity of the inventive receiver.

Figure 1:
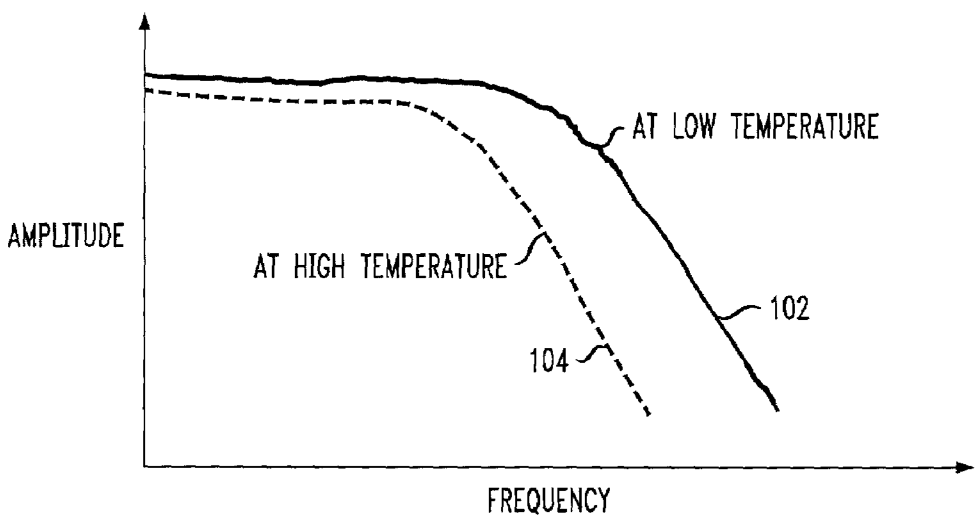
FIG. 1 depicts APD frequency as a function of amplitude.
Figure 2:
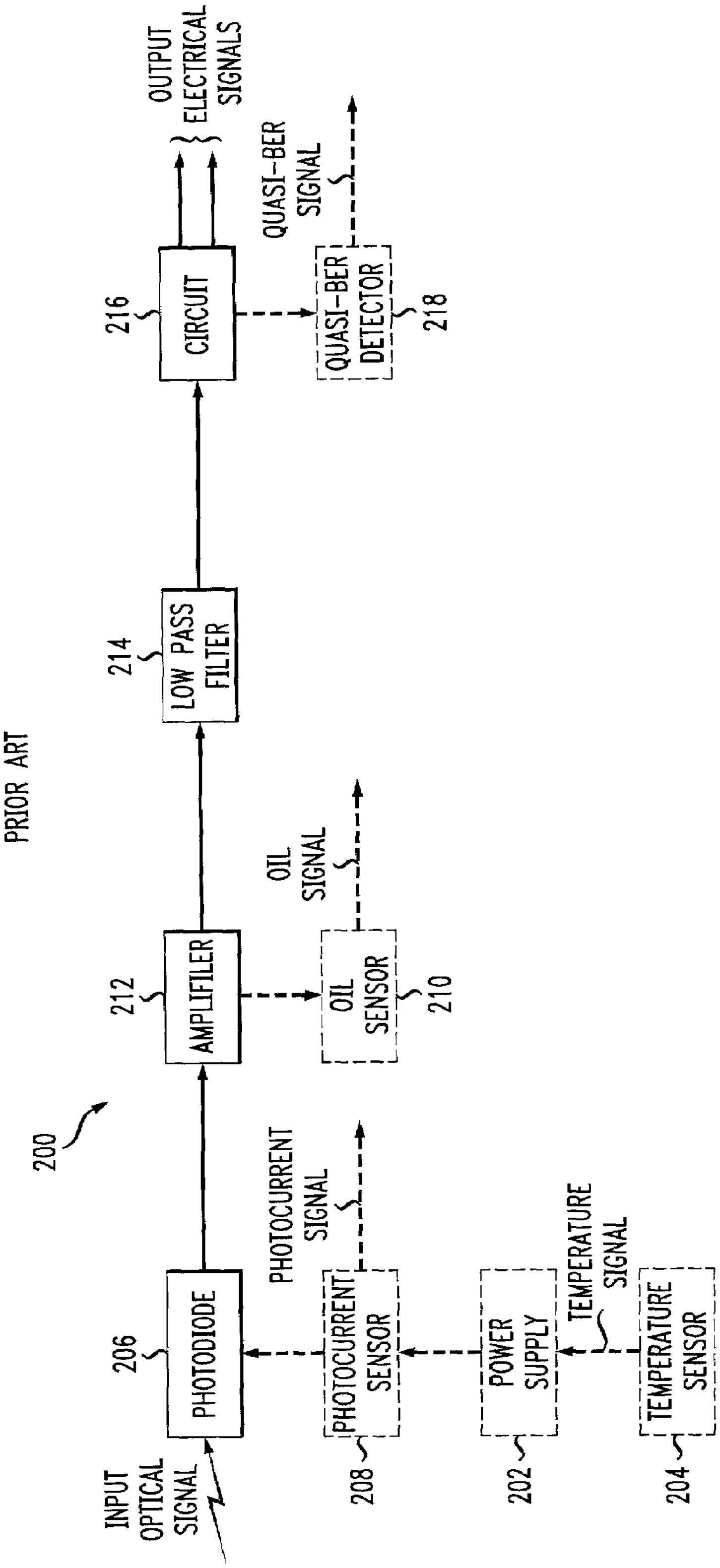
FIG. 2 depicts a prior art optoelectronic receiver.
Figure 3:
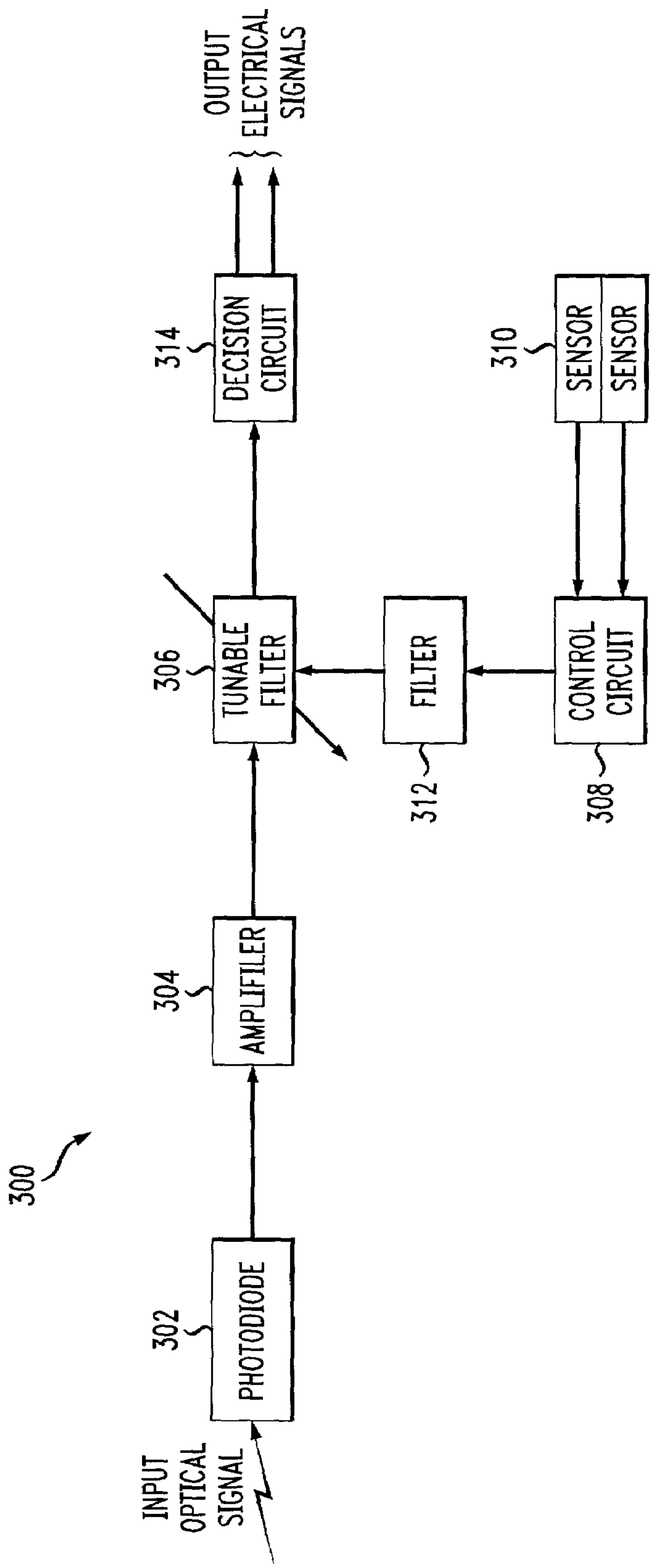
FIG. 3 depicts an optoelectronic receiver according to a first illustrative embodiment of the invention.

FIGS. 3–8 depict optoelectronic receivers according to illustrative embodiments of the invention. FIG. 3 depicts a first illustrative embodiment of the invention. Receiver 300 has a linear circuit comprising a photodiode 302, amplifier 304 and a tunable filter 306. Amplifier 304 is electrically connected to photodiode 302. The output of amplifier 304 is input to tunable filter 306. A control circuit 308 receives signals from one or more sensors 310. Sensors 310 provide control circuit 308 with signals representing operating conditions. These condition signals are processed by control circuit 308 which then provides a signal that is a function of operational conditions to filter 312. Filter 312 at least partially filters out noise. The filtered control signal is output from filter 312 and input to tunable filter 306. Based on the control signal, tunable filter 306 adjusts the transfer function of the linear circuit and provides a signal representing this adjusting transfer function. Typically the adjusted signal would be output to a decision circuit 314.

Tunable filter 306 may realize near-optimum raised-cosine pulse waveform at the input of the decision circuit. In an exemplary embodiment, tunable filter 306 may be a three-pole filter. It may comprise filter bandwidth determining elements such as one or more varactor diodes. If, for example, dual varactor diodes are used in the receivers with differential signal chains, the control signal is applied to a common cathode. The anodes are then connected to the differential chain.

Filter 312 may be, for example, a low pass filter. An additional resistor may improve the isolation between signal and control circuits.

In an exemplary embodiment control circuit 308 is a tunable DC voltage source. It may comprise a voltage source and trimmer potentiometer such as a digitally controlled potentiometer. The output voltage of control circuit 308 controls tunable filter 306 parameters by changing varactor diode biasing voltage, which in turn changes the capacitance of the varactor diode.

During fabrication, the receiver is tuned by a technological control computer which sets the power of the input optical test signal of the receiver close to the sensitivity level, then changes the resistance of the potentiometer until, for example, the best BER is achieved. This value is saved, for example, in nonvolatile memory of the potentiometer. The minimum BER condition typically corresponds to the best sensitivity of the receiver. The test signal may also contain optical input noise signals with predetermined power levels. Thus, a value providing maximum sensitivity may be established.

Sensors 310 may be, for example, temperature sensors, photocurrent sensor, OIL sensors, bit-rate detectors, wavelength sensors, quasi-BER level sensors or BER analyzers. These sensors generate an electrical signal corresponding to a change in an operating condition of the communication system. The conditions being sensed may be any condition affecting the characteristics of the linear circuit output signal which may be monitored and compensated for by the receiver.

If, for example, the ambient temperature changes, the transfer function of the linear circuit of the receiver changes from its optimum shape causing ISI, SNR, BER and sensitivity degradation. Control circuit 308 analyzes signals from the output of sensors 310 and creates a control signal that changes the parameters of tunable filter 306. Tunable filter 306 provides corresponding changes in the shape of the signal at the input of decision circuit 314 to keep low ISI, high SNR, minimize BER, and improve receiver sensitivity. Filter 312 is optional and filters out noise from the control signal and may protect the input to decision circuit 314 from additional noise signals coming from control circuit 308 which otherwise may degrade parameters of receiver.

If photodiode 302 is an APD, an on-board temperature sensor is usually used in the temperature compensated APD bias circuit. This temperature sensor may be used in the inventive device. In such a case an additional temperature sensor is not necessary.

Sensor 310 may be an input optical power sensor such as a peak detector. This would be applicable for example, if the inventive receiver contained an amplifier or decision circuit integrated circuit that contained a peak detector circuit.

Control circuit 308 and tunable filter 306 parameters depend on the parameters of the linear circuit and input optical and noise signals. For example, if photodiode 302's transfer function bandwidth reduces in comparison to the initial state pass band of tunable filter 306, which may be increased if input noise is low, or reduced if input noise is increased.

As in receiver 300 depicted in FIG. 3, receivers shown in FIGS. 4–8 have linear circuits comprising a photodiode 418, 510, 604, 712 and 828, an amplifier 420, 512, 606, 714 and 830, and a tunable filter 402, 514, 610, 720 and 816. The transfer functions of these photodiode, amplifier, tunable filter combinations is adjusted to compensate for varying operating conditions. Each receiver is shown providing a signal to a decision circuit 422, 518, 620, 726 and 832. Also included in each of these FIGURES is an optional noise filter 424, 516, 622, 728 and 824. Each of these circuits will be described in more detail below.

Figure 4A:
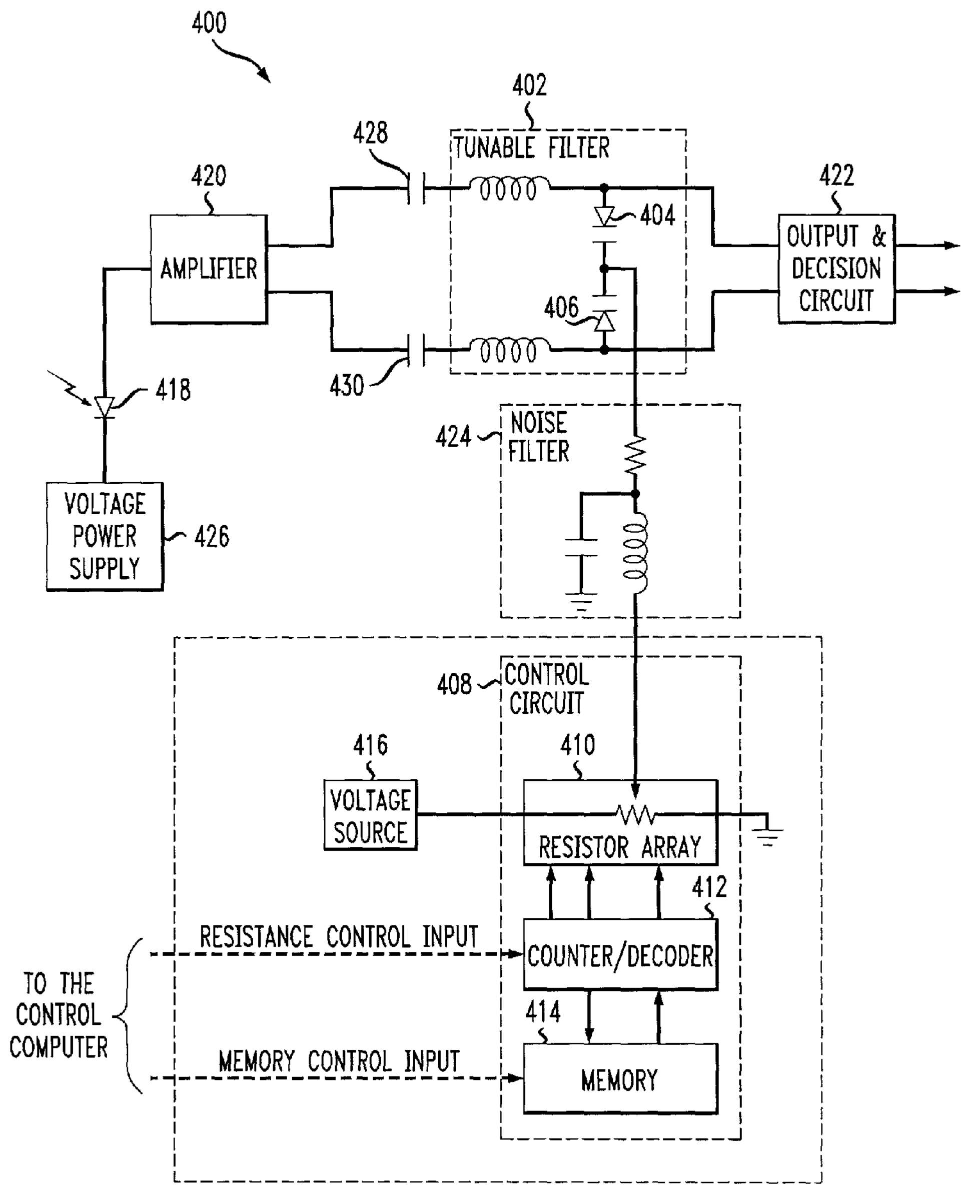
FIGS. 4A–B depict an optoelectronic receiver according to a second illustrative embodiment of the invention and a variation thereof.

FIG. 4A depicts receiver 400, a second illustrative embodiment of the invention. Voltage power supply 426 provides a voltage to photodetector 418. Receiver 400 further comprises a tunable filter 402 having two varactors 404 and 406 as described above. Control circuit 408 comprises a resistor array 410, a counter/decoder 412 and a memory 414. Counter/decoder 412 receives a resistance control input from a control computer. The control computer also provides a memory control input to memory 414. Resistor array 410 receives a signal from reference voltage source 416.

Figure 4B:
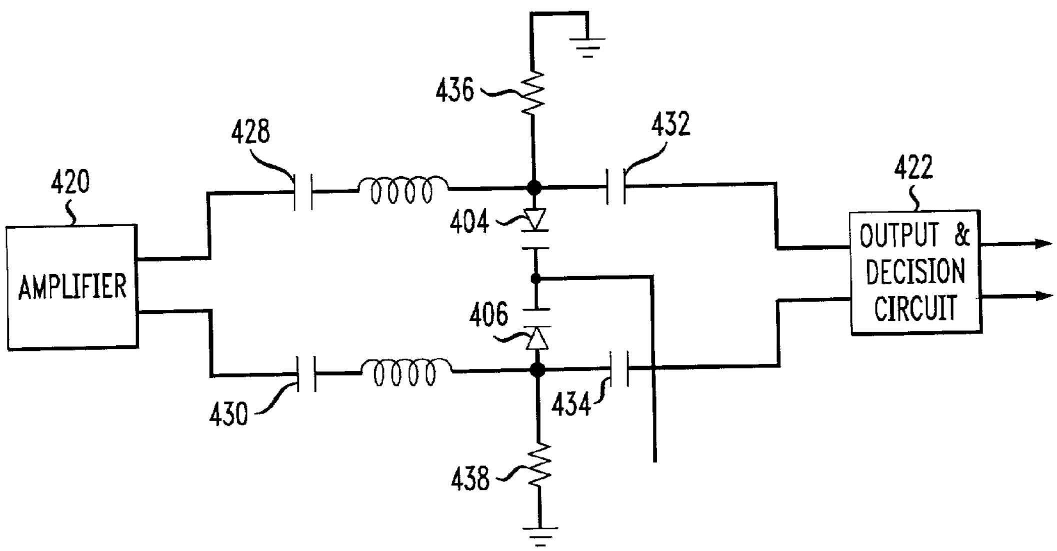
Figure 5:
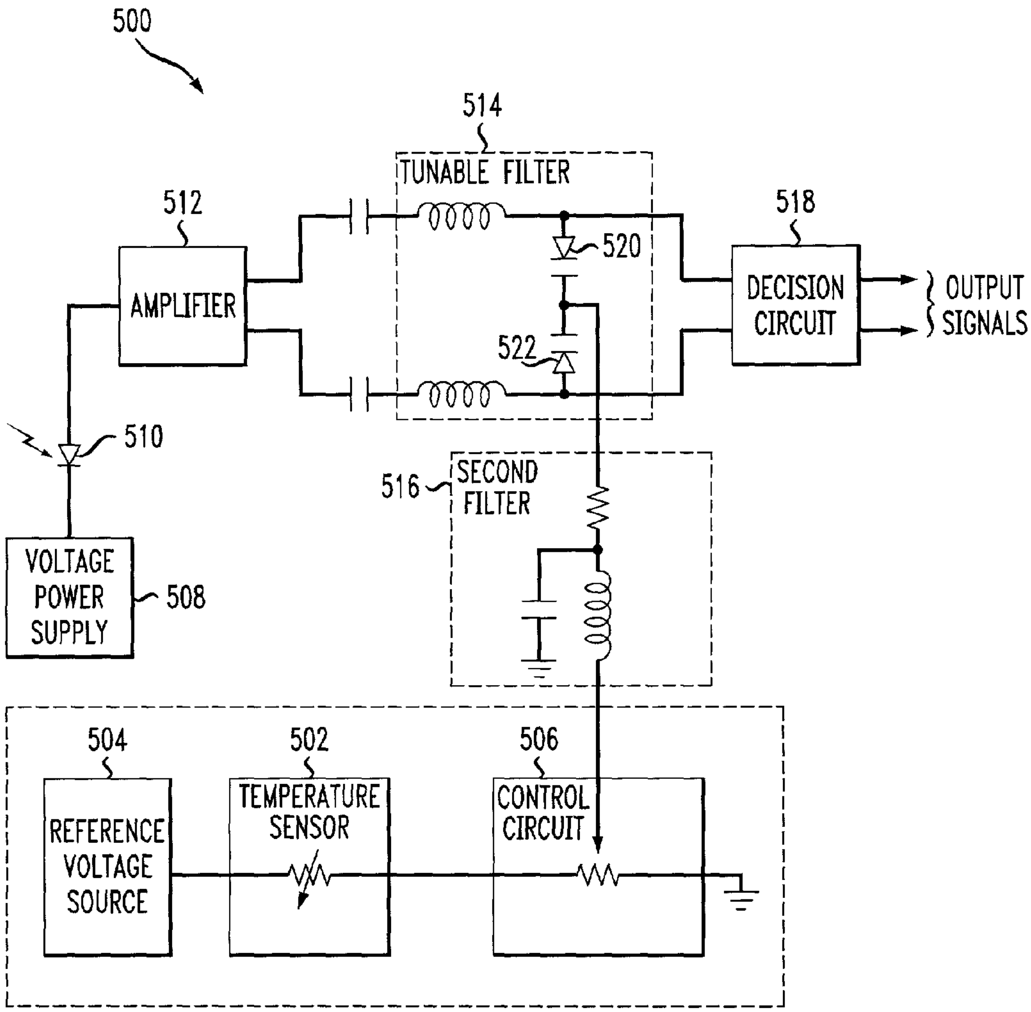
FIG. 5 depicts an optoelectronic receiver according to a third illustrative embodiment of the invention.
Figure 7:
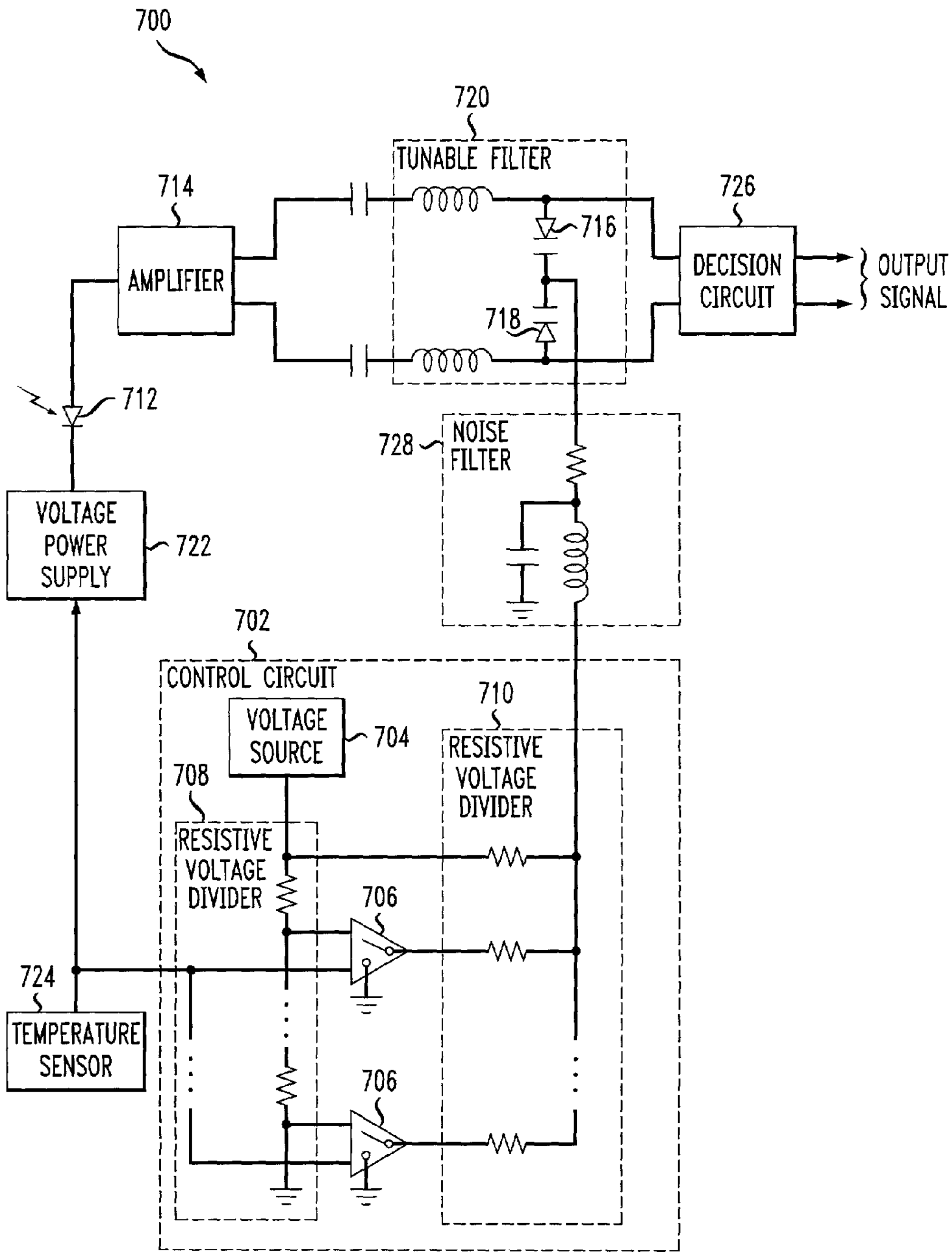
FIG. 7 depicts an optoelectronic receiver according to a fifth illustrative embodiment of the invention.

The embodiment depicted in FIG. 4A has two capacitors 428 and 430 between the outputs of amplifier 420 and the inputs of tunable filter 402, indicating AC coupling. There are no capacitors between tunable filter 402 output and decision circuit 422 input, indicating DC coupling. (The same is shown in FIGS. 5 and 7) In this case control voltage on the cathodes of varactors 404 and 406 is referenced to the voltage on the anodes of varactors 404 and 406, which is equal to the DC voltage on the inputs of decision circuit 422 (typically this is a stable DC voltage). Tunable filter 402 can be AC coupled to decision circuit 422 and DC coupled to amplifier 420 if the output DC voltage on the output of amplifier 420 is stable and the input DC voltage of decision circuit 422 is unstable. If DC voltages on the output of amplifier 420 and the input of decision circuit 420 are equal to each other, the capacitors 428 and 430 are not needed. This usually happens if both circuits have the same structure, for example positive-referenced emitter coupled logic (PECL) structure. If both voltages are not stable it is desirable to include additional resistors and capacitors as shown in FIG. 4B. A plurality of capacitors, such as 432 and 434, are placed between the output of tunable filter 402 and the input of decision circuit 422. A plurality of resistors, such as 436 and 438, are positioned between the anodes of the varactors 404, 406 and for example, ground point. The configuration shown in FIG. 4B is a differential chain. It is noted that a single chain may also be used.

FIG. 5 provides a third illustrative embodiment of the invention. Receiver 500 includes a temperature sensor 502. Temperature sensor 502 receives a signal from reference voltage source 504. Temperature sensor 502 provides a signal that is a function of ambient temperature to control circuit 506. Voltage power supply 508 provides power to photodiode 510. As in previously described embodiments of the invention, the linear circuit includes photodiode 510, an amplifier 512 and a tunable filter 514. Tunable filter 514 is shown as having varactors 520 and 522 but, as with any embodiments of the invention, may be any tunable filter capable of operating as described herein. A second filter 516 may also be included primarily for noise filtering. Receiver 500 is shown providing a signal to decision circuit 518. If the temperature changes, then the transfer function of the linear circuit changes, and receiver parameters may degrade. In an exemplary embodiment, the temperature sensor is a thermistor. If the temperature sensor resistance decreases then the control voltage increases and the varactor capacitance decreases causing the tunable filter bandwidth to increase. This leads to a change in the transfer function which compensates for the temperature change. Accordingly, the receiver parameter degradation may be reduced.

Figure 6:
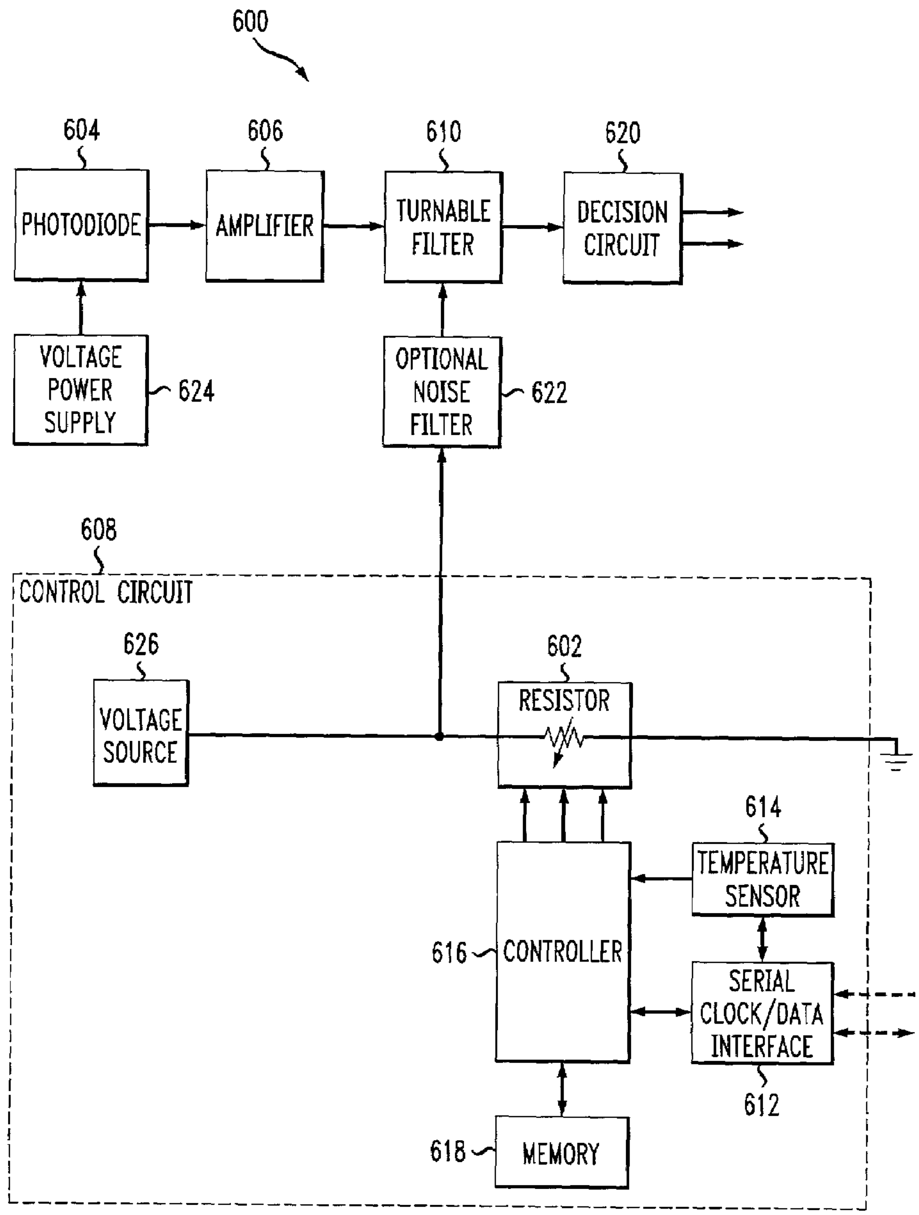
FIG. 6 depicts an optoelectronic receiver according to a fourth illustrative embodiment of the invention.

FIG. 6 depicts a fourth illustrative embodiment of the invention wherein a temperature controlled variable resistor 602 is used in control circuit 608 of receiver 600. In this embodiment a temperature sensor is not necessary in addition to that which is contained in a control circuit 608. Control circuit 608 may include a reference voltage source 626, variable resistor 602, controller 616, serial clock/data interface 612, temperature sensor 614 and memory 618. These components may be included on one or more chips. The value of resistor 602 is determined by a temperature-address look-up table, which assigns a unique value to the resistor for every temperature over an operating temperature range. The values of the resistor for each temperature may be determined preliminary by minimizing BER or SNR for the type of photodiode 604 and amplifier 606 used. The temperature-controlled variable resistor may be programmed through the serial clock/data interface 612 during testing of the receiver at a temperature $T_1$. In this state, control voltage $V_{control\ 1}$ on the output of control circuit 608 has a value at which tunable filter 610 has optimum parameters for desired receiver performance. If the temperature of photodiode 604 changes to $T_2$, for example, wherein $T_2$ is less than $T_1$, the transfer function bandwidth of the linear circuit decreases from the optimum bandwidth, and receiver performance degrades. Temperature sensor 614 provides an electrical signal correlated to temperature $T_2$ of photodiode 604. Controller 616 uses temperature as an address in the look-up table in memory 618 to find and set an optimum value of the resistor in 602. In this state the output voltage of control circuit 608 is equal to the predetermined optimum value $V_{control\ 2}$. Control voltage $V_{control\ 2}$ changes the capacitance of varactor diode (not shown) in tunable filter 610, changing the transfer function of tunable filter 610. Tunable filter 610 changes the transfer function of the photodetector 604, amplifier 606 and tunable filter 610 combination. Since the control voltage $V_{control\ 2}$ is the optimum voltage for the new temperature $T_2$ of photodiode 604, receiver parameters improvement at the new operational condition should be achieved. Further depicted in FIG. 6 is a voltage power supply 624 which provides a voltage to photodiode 604.

FIG. 7 depicts a fifth illustrative embodiment of the invention. In receiver 700, a voltage power supply 722 provides a voltage to photodiode 712. Control circuit 702 may comprise reference voltage source 704, with one or more comparators 706 and resistive voltage dividers 708 and 710. Comparators 706 compare a temperature signal from temperature sensor 724 with a reference voltage provided by the output of a first voltage divider 708. Comparators 706 switch control inputs of the second voltage divider 710 to a new state. Voltage divider 710 may be, for example, a resistor network. In this state an output voltage of control circuit 702 is substantially equal to the predetermined optimum value $V_{control\ 2}$. Correlation between the optimum control voltage can be determined during testing of the receiver for the concrete types of photodiode 712 and amplifier 714. The control voltage $V_{control\ 2}$ changes capacitance of varactors 716 and 718, changing the parameters of tunable filter 720. Tunable filter 720 changes the transfer function of the combination of photodetector 712, amplifier 714 and tunable filter 720. The change in transfer function should improve the parameters of the receiver at the new operational conditions.

Figure 8:
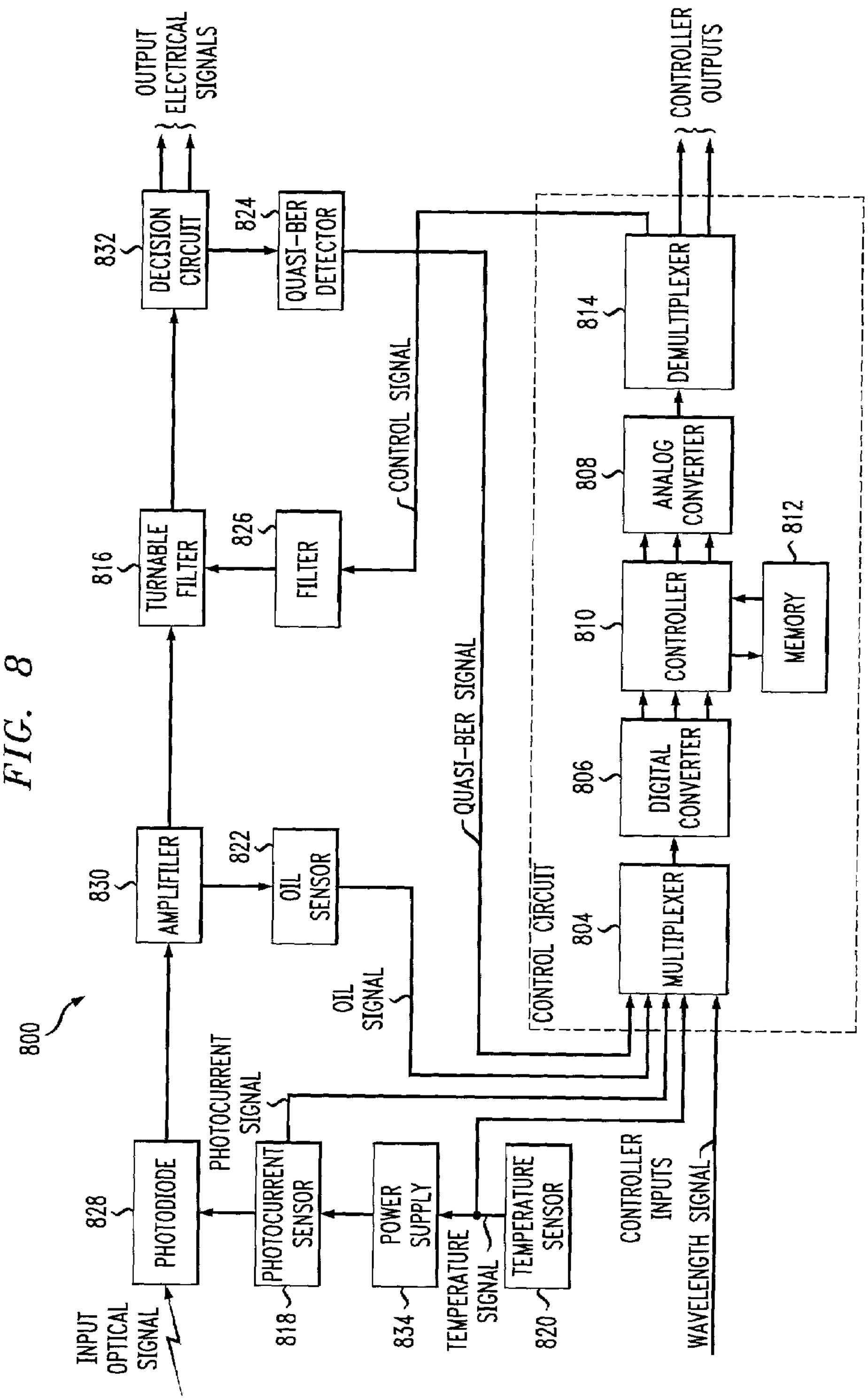
FIG. 8 depicts an optoelectronic receiver according to a sixth illustrative embodiment of the invention.

FIG. 8 depicts a sixth embodiment of the invention. In receiver 800, a voltage power supply 834 provides a voltage to photodiode 828 through photocurrent sensor 818. Control circuit 802 may comprise a multiplexer 804, an analog to digital converter 806, a digital to analog converter 808, a controller 810, a memory 812, and a demultiplexer 814. Control circuit 802 receives a signal from a plurality of sensors. FIG. 8 depicts a photo current sensor 818, temperature sensor 820, OIL sensor 822 and quasi-BER sensor 824. All or some of the sensors depicted in FIG. 8 may be incorporated into embodiments of the invention. Based on the signal(s) received from the sensor(s), control circuit 802 sets optimum parameters of tunable filter 816 in order to optimize receiver parameters for the operational conditions.

Different algorithms may be used for device operation depending on the type or types of sensors. In an exemplary embodiment of the invention the sensors indicate a change of operational conditions of the receiver. Control circuit 802 monitors the sensor signals and if a change is detected, control circuit 802 provides a change to a control signal to adjust it to a predetermined optimum value. The target control voltage may be determined by reading a look-up table stored in memory 812.

If for example, quasi-BER sensor 824 is used, BER degradation is sensed and a signal representing the BER change would be provided to control circuit 802. Control circuit 802 would adjust the control voltage to obtain parameters of tunable filter 816 corresponding to a minimum BER signal on the output of sensor 824. This condition would correspond to a minimum BER of the output electrical signal.

Figure 9:
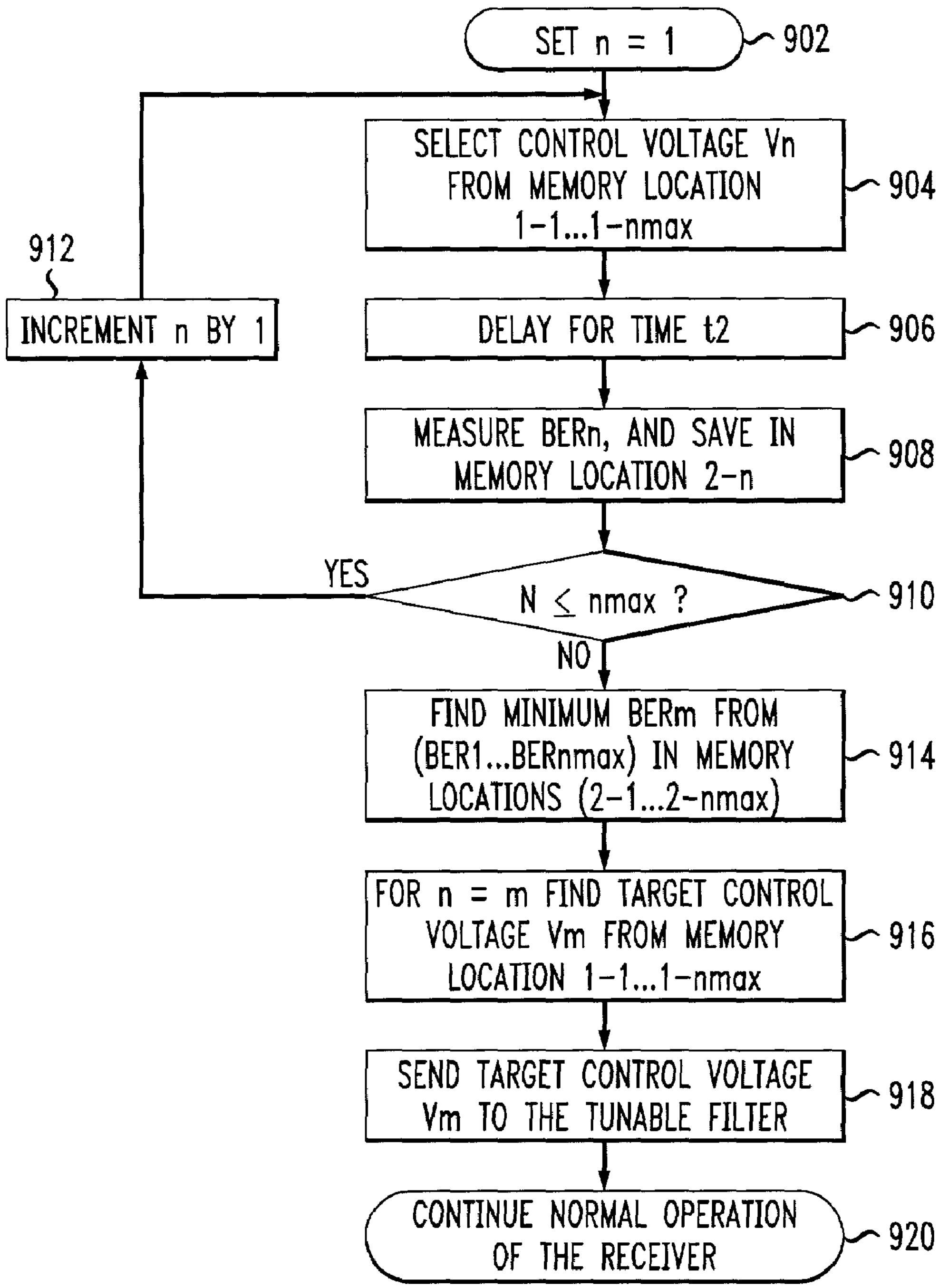
FIG. 9 depicts a flow chart for an algorithm according to an illustrative embodiment of the invention.
Figure 10:
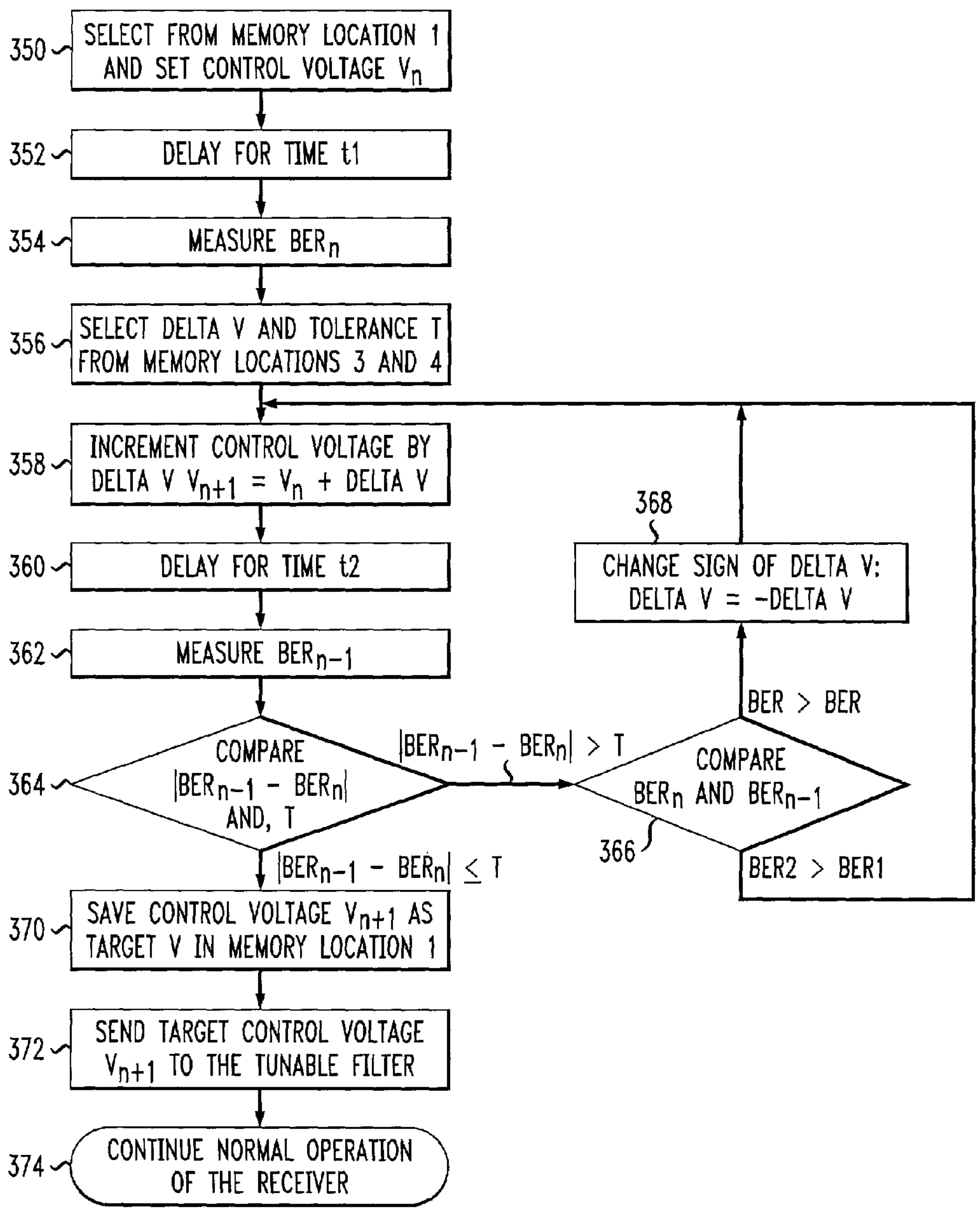
FIG. 10 depicts a flow chart for an algorithm according to a further illustrative embodiment of the invention.

Flow charts of illustrative embodiments for device operation are shown in FIGS. 9 and 10. The flow chart in FIG. 9 begins by setting n=1 in step 902. In step 904 a control voltage $V_n$ is selected from a first memory location 1-1 . . . 1-$n_{max}$. 1-1 . . . 1-$n_{max}$ are control voltage value storage locations for increments 1-$n_{max}$ $n_{max}$ is the number of cycling times needed based on a chosen voltage range and voltage increment size. The control voltage is chosen based on the system requirements, the type of tunable filter and the available power supply for the device.

A delay for time $t_2$is provided in step 906. $BER_n$ is measured and saved in a second memory location 2-n in step 908. In step 910 it is determined whether $n \leqq n_{max}$. If $n \leqq n_{max}$ then n is incremented by one in step 912. If $n \neq n_{max}$ then the process proceeds to step 914. In step 914 a minimum $BER_m$ is found from $BER_1$ . . . $BER_{nmax}$ in the second memory locations 2-1 . . . 2-$n_{max}$. In step 916 for n=m, a target control voltage $V_m$ is found from the first memory location 1-1 . . . 1-$n_{max}$. In step 918 the target control voltage $V_m$ is sent to the tunable filter. In step 920 the normal operation of the receiver is continued.

FIG. 10 depicts another illustrative flowchart for use in embodiments of the invention. In step 350 a selection is made from a first memory location and a control voltage $V_n$ is set. A time delay $t_1$ is implemented in step 352. In step 354 $BER_n$ is measured. A $\Delta V$ and tolerance T are selected from memory locations 3 and 4 in step 356. In step 358 the control voltage is incremented by $\Delta V$ wherein $V_{n+1}=V_n+\Delta V$, wherein n=1, 2, 3 . . . A second time delay $t_2$ is implemented in step 360. In step 362 $BER_{n+1}$ is measured. In step 364 the absolute value of the difference between $BER_{n+1}$ and $BER_n$ is compared with tolerance T. If the absolute value of the difference in BER values is greater than T, then $BER_n$ is compared with $BER_{n+1}$. If $BER_{n+1}$ is less than $BER_n$, then the process proceeds back to step 358 and the control voltage $V_n$ is incremented by $\Delta V$. If $BER_{n+1}$ is greater than $BER_n$, then in step 368 the sign of $\Delta V$ is changed and then the process loops back to step 358. If the comparison in step 364 provides that $|BER_{n+1}-BER_n|$ is $\leqq T$ then the corresponding control voltage $V_n$ is saved as the target control voltage in the first memory location in step 370. The target voltage is then sent to the tunable filter causing the transfer function of the linear circuit to be adjusted. Normal operation of the receiver is then continued in step 374.

Figure 11:
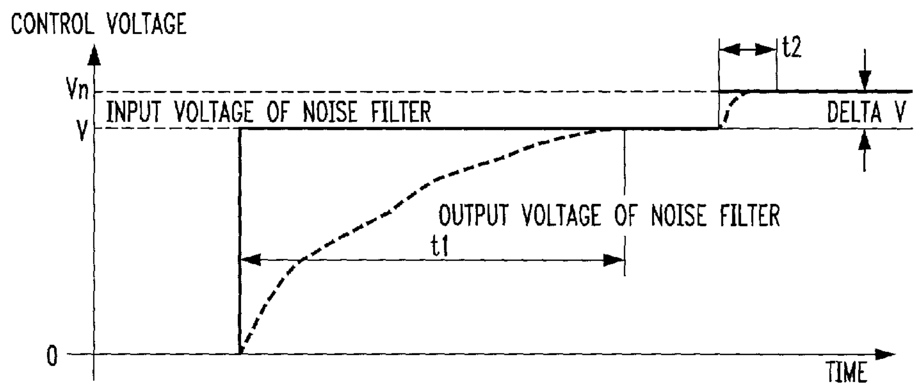
FIG. 11 depicts control voltage with respect to time for an illustrative embodiment of the invention.

It is preferrable to optimize the control voltage by allowing a settling time after voltage changes. FIG. 11 depicts control voltage with respect to time for an illustrative example of the invention. Time $t_1$ is the settling time of the control voltage on the output of a filter such as filter 826 in FIG. 8 when its input voltage changes from 0 to V. Time $t_2$ is the settling time of the control voltage on the output of a filter such as filter 826 when its input voltage changes from V to V+$\Delta$V, wherein $t_1$ is $>t_2$. Parameters $t_1$ and $t_2$ depend on filter characteristics. A process for the optimization of the control voltage may also be initiated when the receiver is turned on.

Figure 12:
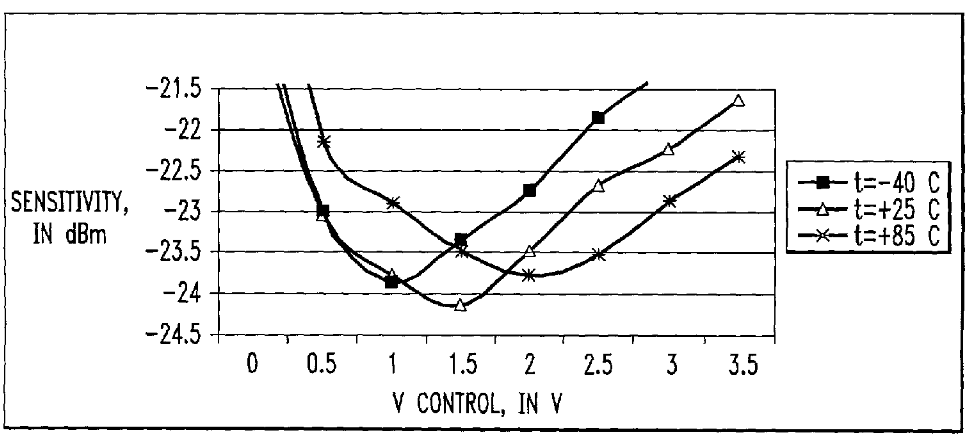
FIG. 12 provides a graph of sensitivity vs. control voltage at selected ambient temperatures for an optical receiver with a PIN-type photodiode according to an illustrative embodiment of the invention.

FIG. 12 provides a graph of sensitivity vs. control voltage at the ambient temperature of −40° C., +25° C. and +85° C. for an optical receiver with a PIN-type photodiode. A sensitivity improvement of 1.5 dB is achieved with respect to a conventional optical receiver.

The optimum tuning of the receiver provided by embodiments of the invention generates optimum receiver parameters such as ISI, SNR, BBK and sensitivity which may increase fiber span length in an optical fiber communication system. Receiver parameters are protected against component manufacturing variations. Additionally, average sensitivity may increase and standard deviation may decrease, thus increasing product yield.

Embodiments of the invention may improve optoelectronic receiver performance over temperature ranges, at different levels of input noise and over wavelength ranges. Additionally, component aging may be compensated for.

Advantageously, embodiments of the invention may be used in wider temperature ranges than prior art receivers. The lifetime of the receivers may also be increased as aging is compensated for. The receivers may be used for building adaptive receivers. Receiver linear circuit transfer function bandwidth control and optimization may be provided at different operational conditions.

While the invention has been described by illustrative embodiments, additional advantages and modifications will occur to those skilled in the art. Therefore, the invention in its broader aspects is not limited to specific details shown and described herein. Modifications, for example, to circuit designs having a tunable filter, may be made without departing from the spirit and scope of the invention. Accordingly, it is intended that the invention not be limited to the specific illustrative embodiments but be interpreted within the full spirit and scope of the appended claims and their equivalents.

The invention claimed is:

1. An optoelectronic receiver comprising:

a linear circuit comprising a tunable filter having a transfer function, a photodiode electrically connected to an amplifier, and the tunable filter electrically connected to the amplifier, wherein the amplifier receives an output signal from the photodiode and provides an amplified signal to the tunable filter; and a control circuit electrically connected to the tunable filter, the control circuit connected to one or more sensors which sense one or more operational conditions;

wherein the control circuit generates a control signal that is a function of the one or more sensed operational conditions, and the control signal is input to the tunable filter which adjusts the linear circuit's transfer function based on the control signal.

2. The optoelectronic receiver of claim 1 wherein the operational conditions are selected from the group consisting of temperature, photocurrent, optical input light, bit-rate, wavelength, quasi-bit-error-rate and bit-error-rate.

3. The optoelectronic receiver of claim 1 wherein the control circuit comprises one or more of the following: resistor array, counter/decoder and memory.

4. The optoelectronic receiver of claim 1 wherein the photodiode is an avalanche photodiode.

5. The optoelectronic receiver of claim 1 wherein the control circuit comprises a digitally controlled variable resistor.

6. The optoelectronic receiver of claim 1 wherein the tunable filter comprises a three-pole filter.

7. The optoelectronic receiver of claim 1 wherein the tunable filter comprises one or more filter bandwidth determining elements.

8. The optoelectronic receiver of claim 1 wherein the tunable filter comprises one or more varactors.

9. The optoelectronic receiver of claim 1 wherein the control circuit comprises a tunable DC voltage source.

10. The optoelectronic receiver of claim 1 wherein the control circuit comprises:

a reference voltage source; one or more comparators;

a first voltage divider electrically connected to the reference voltage source and the one or more comparators; and a second voltage divider electrically connected to the one or more comparators;

wherein the one or more comparators compare a signal from the sensor(s) with a reference voltage output by the first voltage divider and modifies the reference voltage to substantially equal a predetermined optimum control voltage which is input to the second voltage divider, the second voltage divider outputs a signal to the tunable filter, thus modifying the linear circuit transfer function according to the conditions determined by the sensor(s).

11. The optoelectric receiver of claim 1 further comprising a second filter connected between the tunable filter and the control circuit.

12. A method of adjusting an optoelectronic signal in a linear circuit according to operating conditions, the linear circuit having a tunable filter, a photodiode electrically connected to an amplifier, and the tunable filter electrically connected to the amplifier, wherein the method comprises:

sensing one or more operating conditions;

providing a control signal that is a function of the operating conditions;

inputting into the tunable filter the control signal;

receiving by the amplifier an output signal from the photodiode;

providing by the amplifier an amplified signal to the tunable filter; and adjusting by the tunable filter the transfer function of the linear circuit based on the control signal.

13. The method of claim 12 further comprising filtering, at least partially, noise from the control signal prior to inputting the control signal to the tunable filter.

14. An optoelectronic communication system comprising an optoelectronic receiver according to claim 1.

15. An integrated circuit comprising an optoelectronic receiver according to claim 1.

16. A method of adjusting an optoelectronic signal in a linear circuit according to operating conditions, the linear circuit having a tunable filter, wherein the method comprises:

a. selecting a control voltage $V_n$ from a first memory location wherein n=1, 2, 3 . . . ;

b. delaying for a time period to allow the control voltage to settle;

c. measuring the bit-error-rate $BER_n$ at the selected control voltage;

d. determining whether $n \leq n_{max}$;

e. if $n \leq n_{max}$ then incrementing n by 1 and selecting from the first memory location a control voltage corresponding to the incremented n value then returning to step c;

f. if $n \nleq n_{max}$ then finding the minimum bit-error-rate $BER_m$ from $BER_1$ . . . $BER_{max}$ in a second memory location;

g. finding a target control voltage $V_m$ from the first memory location for n=m;

h. sending the target control voltage $V_m$ to the tunable filter, thereby causing the transfer function of the linear circuit to be adjusted according to the operating conditions.

17. A method of adjusting an optoelectronic signal in a linear circuit according to operating conditions, the linear circuit having a tunable filter, wherein the method comprises:

a. selecting from a first memory location a control voltage $V_n$;

b. delaying for a first time period to allow the control voltage to settle;

c. measuring the bit-error-rate, $BER_n$;

d. selecting $\Delta V$ and tolerance T from a second and third memory location, respectively;

e. incrementing the control voltage by ΔV so that $V_{n+1}=V_n+\Delta V$;

f. delaying for a second time period to allow the control voltage to settle;

g. measuring the bit-error-rate, $BER_{n+1}$;

h. comparing $|BER_{n+1}-BER_n|$ and T;

i. if $|BER_{n+1}-BER_n|>T$ then comparing $BER_n$ to $BER_{n+1}$;

j. if in step i, $BER_{n+1}>BER_n$ then changing the sign of ΔV and returning to step e;

k. if in step i, $BER_{n+1}<BER_n$ then returning to step e;

l. if in step h, $|BER_{n+1}-BER_n|\leqq T$, then saving the control voltage $V_{n+1}$ as the target voltage in the first memory location; and m. sending the target control voltage $V_{n+1}$ to the tunable filter causing the transfer function of the linear circuit to be adjusted according to the operating conditions.

* * * * *